Feb. 25, 1969 J. W. ROSENDALE 3,429,566

VEHICLE SUSPENSION

Filed Jan. 16, 1967 Sheet 1 of 2

JOHN W. ROSENDALE
INVENTOR

BY H. C. Goldwire

AGENT

VEHICLE SUSPENSION
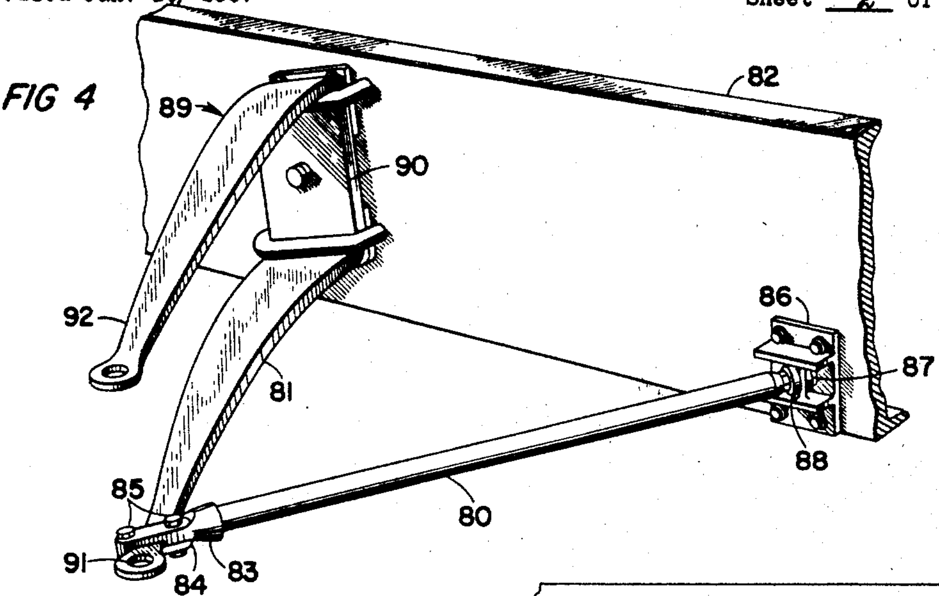
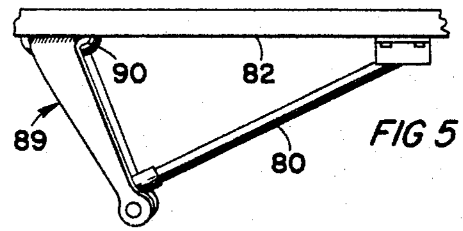
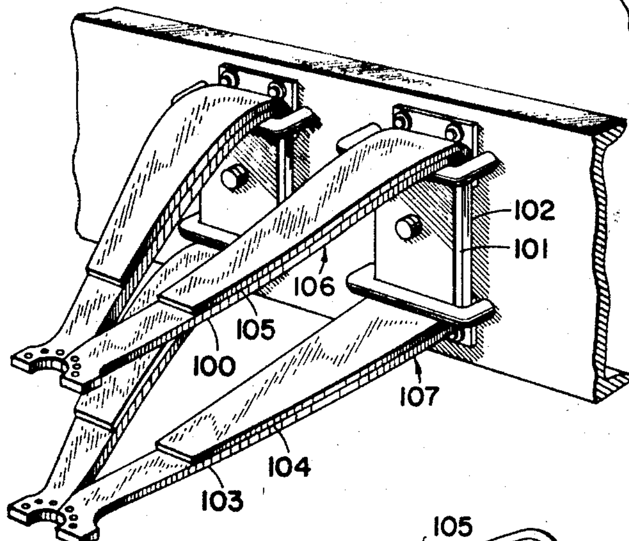
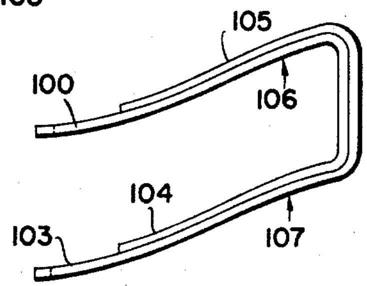
JOHN W. ROSENDALE
INVENTOR
BY H. C. Goldwire
AGENT United States Patent Office 3,429,566

Patented Feb. 25, 1969

3,429,566

VEHICLE SUSPENSION

John W. Rosendale, Mount Clemens, Mich., assignor to LTV Aerospace Corporation, Dallas, Tex., a corporation of Delaware Filed Jan. 16, 1967, Ser. No. 609,646
U.S. Cl. 267—36 10 Claims
Int. Cl. B60g *11/02;* F16f *1/18*

ABSTRACT OF THE DISCLOSURE

A suspension system for a wheeled vehicle wherein the suspension system is of a rugged, simple construction which absorbs blows to the wheels from multiple directions and which has a variable spring rate.

This invention relates to a suspension apparatus and more particularly to an apparatus for resiliently suspending a vehicle chassis relative to a wheel.

In accordance with the invention there is provided a suspension apparatus for a vehicle having a wheel on a spindle, including a suspension member with a base section and two resilient arms extending together away from the base section and including means for attaching the suspension member to the vehicle at the base section so that the ends of the arms opposite the base section are displaced from the base section in the dimension parallel to the spindle, the resilient arms being adapted at the ends for attachment to the spindle.

When a vehicle is to be operated in rough terrain, its suspension system must be highly durable. It is also desirable that the suspension system be simple to install, particularly if repairs are required under severe conditions, as in combat operations. Both durability and simplicity of installation depend heavily on the type of mounting structure developed to attach the suspension apparatus to the vehicle. Thus, the attainment of improved durability and simplicity of installation is advanced by the provision of an effective mounting.

The wheels of a vehicle operating in rough terrain are subjected to impacts from various directions. In particular, the forces on the wheels may have large horizontal components directed from the front to the rear of the vehicle. Often suspension systems are arranged to permit relative movement of the wheel and vehicle chassis in the vertical direction. Such a suspension tends to soften only the vertical component of a blow to the wheel. For providing the most effective suspension under severe conditions, there is needed a suspension apparatus which will receive and soften blows from multiple directions.

Accordingly, it is a major object of the invention to provide durability and simplicity of installation in a suspension apparatus for a wheeled vehicle.

Another object of the invention is to provide a vehicle suspension apparatus which is ruggedly and simply mounted.

A further object is to provide a suspension apparatus for a wheeled vehicle which apparatus softens the effect of blows to the wheels from multiple directions.

Other objects and advantages will be apparent from the specification and claims and from the accompanying drawing illustrative of the invention.

FIGURE 4 is a perspective representation of a further suspension apparatus according to the invention.

FIGURE 5 is a plan representation of the apparatus of FIGURE 4.

FIGURE 6 is a perspective representation of yet another suspension apparatus according to the invention.

FIGURE 7 is a side elevational view of the apparatus of FIGURE 6.

Figure 1:
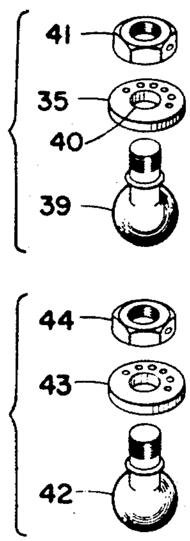
FIGURE 1 is a perspective representation of a suspension apparatus according to the invention.
Figure 1:
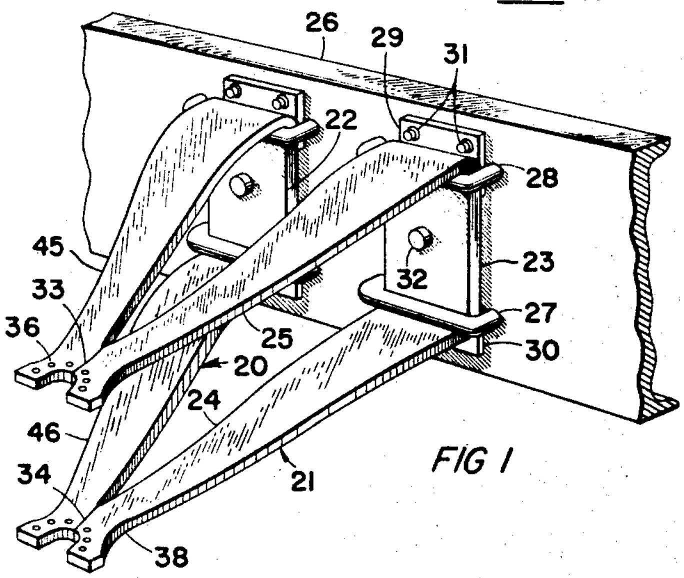

Referring now to the drawing, there will be described a preferred embodiment of a wheeled vehicle supsension apparatus according to the invention. In the suspension apparatus of FIGURE 1, there are shown two suspension members 20 and 21. Member 21 is made of a single piece of steel to have a flat base section 23 and two leaf spring arms 24 and 25 extending together away from opposite sides of the base section. It can be seen from FIGURE 2 that the arms 24 and 25 preferably are tapered, growing thinner toward the ends of the arms opposite the base section 23, although these leaf spring arms may be used without the taper. Member 21 is attached to the vehicle frame 26 as by U bolts 27 and 28, which are secured by nuts on the ends of the bolts hidden by frame 26. Cushion pieces 29 and 30, which are preferably made of steel, are fastened to frame 26 as by bolts 31 to receive base section 23. A locating pin or stud 32, extending from frame 26, slideably engages a hole in base section 23.

The orientation of frame 26 is preferably such that the surface thereof adjacent to base section 23 is vertical. Thus, the dimension in which the width of arms 24 and 25 is measured is horizontal. As seen from FIGURE 1, the width of the arms is greater near the base section 23 and less near the ends opposite the base. FIGURE 2 illustrates the curvature of arms 24 and 25, each of which is shaped so that the end of the arm opposite the base section 23 is downwardly displaced from the end at the base section. However, the vertical separation of the arms 24 and 25 at one end is the same as at the other.

Suspension member 20 is made and mounted in the same manner as member 21, except that the two suspension members 20, 21 are shaped to be symmetrical about a plane passing between them. Members 20 and 21 meet along surfaces 33 and 34 near their outer ends, where they are preferably attached to each other, as by welding. This attachment is not absolutely necessary, however. Additionally, members 20 and 21 may be made from one piece, so that each of the spring arms of each member has a portion in common with the corresponding arm of the other member at the place where surfaces 33 and 34 would be located if members 20 and 21 were made in two separate pieces.

The spring arms of members 20 and 21 are adapted at their ends for attachment to a spindle. Collar 35 fits on the upper arms of members 20 and 21 for attachment thereto by fasteners such as screws (not shown) in holes 36. Collar 43 similarly fits on the lower arms of members 20 and 21. Ball member 39 is engaged in hole 40 of collar 35 and fastened thereto by nut 41. Ball member 42 is likewise fastened in collar 43 by nut 44. A spindle, which is to have a wheel of the vehicle rotatably mounted thereon, and which has ordinary ball joint couplings, then is coupled to ball member 39 and 42 in a manner well known in the art. It will be apparent to those skilled in the art that the spindle will be substantially perpendicular to frame 26 for rear wheels and slightly at an angle with the perpendicular for front wheels. Thus, the ends of the spring arms 24, 25 attached to the spindle extend away from the frame 26 and are displaced from the frame and base section 23 in the dimension parallel to the spindle and act in conjunction with similar members 45, 46 to take the place of an axle or other rigid extension from the vehicle.

Figure 2:
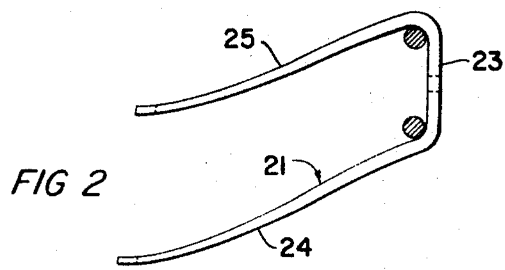
FIGURE 2 is a side elevational view of suspension members shown in FIGURE 1.

In the operation of the apparatus shown in FIGURES 1 and 2, the greatest flexibility of the leaf spring arms is in the vertical direction. Hence, the ends of the arms opposite the base section 23 move vertically for relative motion between vehicle and wheel. The lessening toward the ends of the width of the arms 24, 25 and 45, 46 in the horizontal dimension distributes the stresses of bending in the arms so that they are free to flex widely at the ends.

Contributing to the durability of the apparatus in FIGURES 1 and 2 is the one-piece, base-section-supported construction of member 20 and of member 21. The stresses on a suspension such as that illustrated are particularly severe at the place where the suspension arm is attached to the vehicle. However, the construction of suspension member 21 withstands these stresses better than would, for example, a structure with separate, flat leaf spring arms, each bolted to a mount extending outward from frame 26. Where a base section such as section 23 is mounted on the frame and the arms extend away from the base section at a bend, there is less concentration of stress in the arms and consequently less tendency for the arms to break. Additionally, U bolt 28 is situated so that the cylindrical surface thereof not only bears against base section 23, but also against arm 25 when the arm is flexed. The other bolts are similarly arranged and the effect of the arrangement is to provide a well-distributed support of the adjacent spring arms.

The one-piece members 20 and 21, supported at the base section by U bolts, result in a simple and rugged mounting for the suspension apparatus. The structure, though strong, is simple to install.

Figure 3:
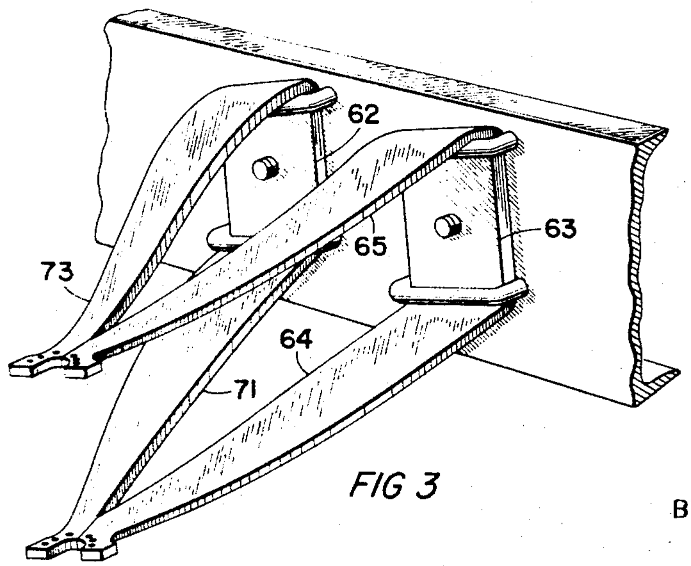
FIGURE 3 is a perspective representation of another suspension apparatus according to the invention.

FIGURE 3 illustrates another embodiment of a suspension apparatus according to the invention. The orientation of the spring arms is generally the same as before, with a spindle being attachable as before on the ends of the arms opposite the base sections 62 and 63. However, the bend where the spring arms extend from the base section is not horizontal as before. Therefore, the cross section of one of the leaf spring arms 64, 65, 71 and 73 in the plane perpendicular to the spindle has a long dimension which lies at an angle with the horizontal. Therefore, the most flexible motion of the spring arms is not vertical, as with the apparatus of FIGURE 1, but at an angle with the vertical. Since the most flexible motion of the spring arms has a horizontal component, the apparatus can move in response to the horizontal component of an impact. When the direction of motion of the vehicle is generally from the left to the right of FIGURE 3, the suspension apparatus is able to soften the effect of impact in both the vertical and the horizontal directions.

The apparatus shown in FIGURE 4 is a further embodiment in which a drag bar 80 is attached to spring arm 81 near the end thereof, opposite frame 82. Bar 80 has, as an integral part thereof, a fastening element 83, which is attached to arm 81 near its outer end by means of a separate fastening piece 84 that fits beneath arm 81 and is secured to element 83 by fasteners 85. A bracket 86 on frame 82 holds the inner end of drag bar 80 by a nut 87 engaged with a threaded portion of bar 80. A rubber bushing 88 engaged by bracket 86 allows bar 80 to move while fastened to the bracket 86.

The leaf spring arms 81, 92 of suspension member 89 are oriented with respect to frame 82 just as were the arms 71, 73 of the apparatus of FIGURE 3. As seen in FIGURE 5, drag bar 80 is connected to frame 82 away from the base section 90 of member 89.

The end of spring arm 81 near bar 80 is shaped differently from the corresponding sections of members 20 and 21 in FIGURE 1, having simply a hole 91 therein. With such a shape, ball members, such as members 39 and 42 in FIGURE 1, may be engaged with suspension member 89 directly, without the requirement of collars such as the collars 35 and 43 in FIGURE 1.

In the operation of the apparatus of FIGURE 4, the drag bar 80 receives some of the impact in the horizontal direction which would otherwise be thrown completely on member 89. In this respect, drag bar 80 takes the place of member 21 in the apparatus of FIGURE 1.

The suspension apparatus of FIGURES 6 and 7 have a multiple-leaf construction. A leaf spring member 106 has arms 100 and 104 extending from a base section 101 and arm 104 is shorter than arm 100. Another leaf spring member 107 has base section 102 which underlies base section 101 of member 106, and member 107 has arm 103 and shorter arm 105 which underlie and overlie arms 104 and 100 respectfully. Leaf spring arms 100 and 103 are adapted at their ends opposite the respective base sections for attachment to a spindle in the manner of the apparaus of FIGURE 1. As shown in FIGURE 7, the leaf spring arms 100, 104 and 105, 103 of the suspension apparatus of FIGURE 6 are curved, in the vertical plane, similarly to those of FIGURES 1 and 2.

In operation, the apparatus of FIGURE 6 provides a variable spring rate. That is, the spring constant of the apparatus is different, because of the multiple leaves, for an extremely low position of the wheel from that for an extremely high position.

Several embodiments of the invention, together with modifications thereof, have been described in detail herein and shown in the accompanying drawing; however it will be evident that various further modifications are possible in the arrangement and construction of its components without departing from the scope of the invention.

I claim:

1. A suspension apparatus for a vehicle having a wheel on a spindle, comprising:

a pair of suspension members, each made of a single piece and each having a base-section and two resilient arms with outer ends, said arms being located at opposite sides and extending together away from a respective base-section, and an end of each of the arms of one suspension member joining with an end of a respective arm of the opposite suspension member to form means for attachment for a spindle; and means for attaching each of said suspension members to said vehicle at the respective base-section so that said ends of said arms are displaced from said base-section in the dimension parallel to said spindle.

2. An apparatus as set forth in claim 1, wherein said means for attaching each member to the vehicle has a surface bearing against said base section to hold said member against said vehicle and a surface adjacent at least one of said resilient arms to bear against said arm when said arm is flexed.

3. An apparatus as set forth in claim 1, wherein said piece of which each suspension member is made is flat and said arms form leaf springs.

4. An apparatus as set forth in claim 1, wherein said means comprises a cylindrical member bearing against each of said base-sections adjacent one of said arms to hold a respective suspension-member against said vehicle and bear against said arm when said arm is flexed.

5. An apparatus as set forth in claim 3, wherein said arms forming leaf springs are tapered and grow thinner toward the outer ends of said arms.

6. An apparatus as set forth in claim 1, wherein each of the suspension members is attached by said means to said vehicle in a relationship in which the cross section of each of said leaf springs in the plane perpendicular to said dimension lies at an angle to the horizontal, whereby the flexing motion of said leaf springs is at an angle with the vertical.

7. A suspension apparatus for a vehicle having a wheel on a spindle, comprising:

a first leaf spring member formed to have a first base section and two arms extending together away from opposite sides of said base section, a second leaf spring member formed to have a second base section overlying said first base section and two arms extending from said second base section and overlying the arms of said first member, an arm of said first member extending from one side of said base sections and the arm of said second member extending from the other side of said base sections being adapted for attachment to said spindle near the ends of said arms opposite said base sections, and means for attaching said leaf spring members to said vehicle at said base sections so that said ends of said arms are displaced from said base sections in the dimension parallel to said spindle.

8. A suspension apparatus for a vehicle having a wheel on a spindle, comprising:

a suspension member made of a single piece to have first and second base sections, a first pair of resilient arms extending together away from opposite sides of said first base section, and a second pair of resilient arms extending together away from opposite sides of said second base section, each of said arms in said first pair having a portion in common with an arm of said second pair near the ends of said arms opposite said base sections, said arms being adapted near said ends thereof for attachment to said spindle, and means for attaching said first and second base sections to said vehicle so that said ends of said arms are displaced from said base sections in the dimension parallel to said spindle.

9. A suspension apparatus for a vehicle having a frame and wheels, said wheels each being mounted on a spindle, said suspension apparatus for each of the wheels comprising:

first and second suspension-members symmetrically arranged around a plane passing between the respective members, each member having a base-portion with opposed bends therein defining base-portion ends and having resilient arms extending together away from the respective ends, said arms each having an outer end positioned opposite said base-portion and each outer end of the first suspension-member being connected to an outer end of the second suspension-member;

means for attaching said spindle to the suspension-member outer ends; and means for attaching each respective suspension-member to the vehicle at the base-section so that said ends of said arms are displaced from said frame in a dimension substantially parallel to said spindle.

10. The suspension apparatus claimed in claim 1, wherein the means for attaching each respective suspension-member to the vehicle comprises at least one cushion-member located between the base-portion and the vehicle frame and adjacent at least one of the base-portion ends to form a space between said base-portion and said frame in which space the base-portion is allowed to flex as the arms of the respective suspension-members are flexed, whereby stresses generated at the base-portion ends by said arm movement are relieved.

References Cited

UNITED STATES PATENTS

| | | | |
|---|---|---|---|
| 1,407,915 | 2/1922 | Belden | 267—41 |
| 2,458,548 | 1/1949 | Aronson | 267—36 |
| 2,534,722 | 12/1950 | Meiklejohn et al. | 267—41 |
| 2,615,710 | 10/1952 | Lyman | 267—41 |

ARTHUR L. LA POINT, *Primary Examiner.*

D. F. WORTH III, *Assistant Examiner.*

U.S. Cl. X.R.

267—41